Patented June 10, 1941

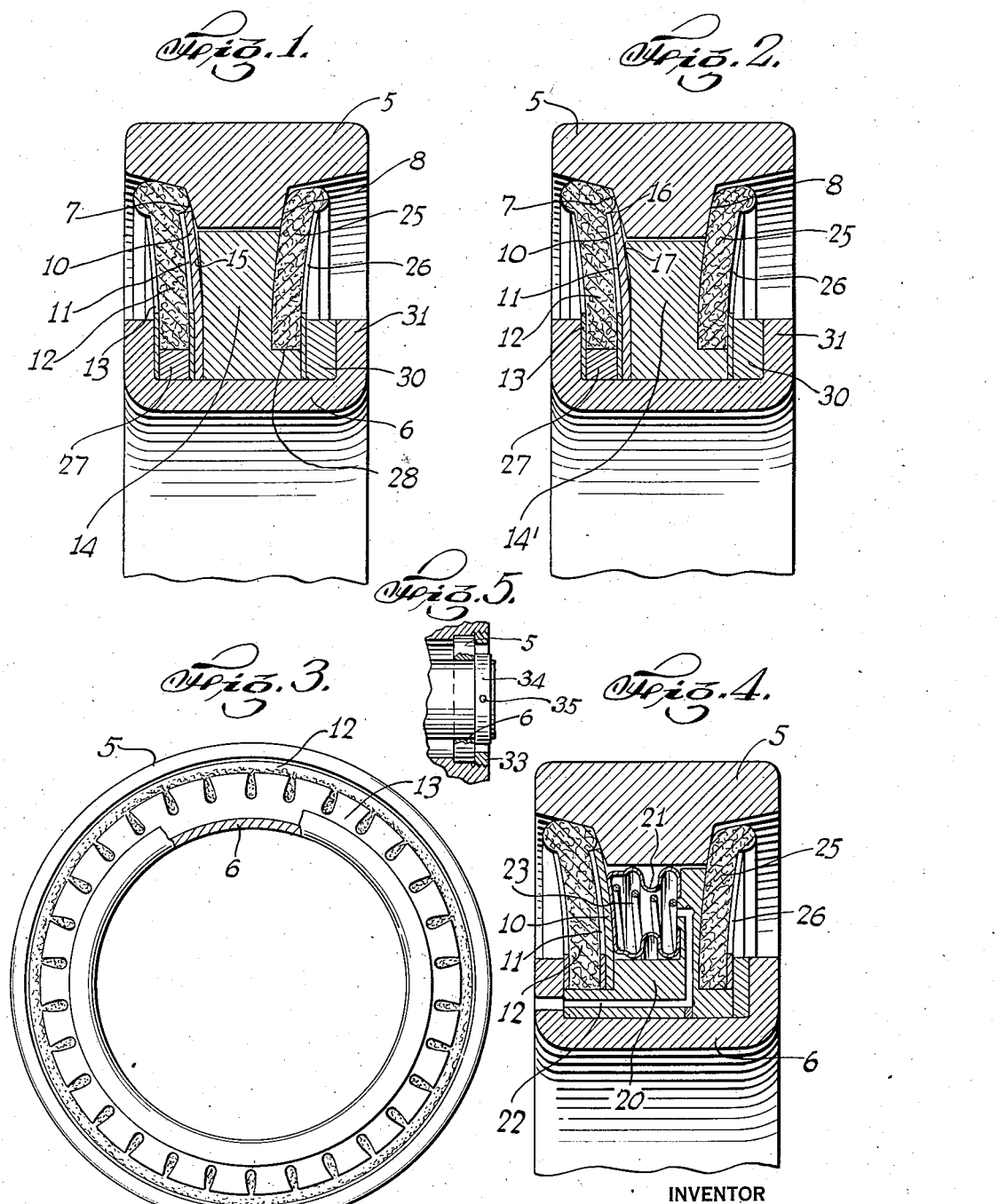

2,245,474

UNITED STATES PATENT OFFICE 2,245,474

PRESSURE LIQUID SEAL

Furness Hall Hately, Greenwich, Conn., assignor to American Felt Company, New York, N. Y., a corporation of Massachusetts Application April 21, 1939, Serial No. 269,079

9 Claims. (Cl. 286—11)

The present invention relates to fluid seals and has for an object to provide a seal capable of effectively preventing oil, grease or other fluid from passing along a rotating shaft between said shaft and the wall of a casing through which the shaft extends. The invention aims further to provide an effective seal capable of withstanding high pressure.

Another object is to provide a tight seal, between a rotating shaft and a casing wall, which will not be broken upon reasonable longitudinal movement of the shaft relative to the casing wall.

Another object is to provide a seal permitting a reasonable eccentric movement of the shaft without leaking.

It is known practice to provide seals in various positions to prevent the flow of oil or grease along a shaft and out of a casing in which the shaft operates and through which the shaft extends as, for example, in the case of the drive shafts and the axles of automobiles and in various machines.

In many installations, for example in machinery used in chemical operations, it is desirable to provide a seal which allows so exceedingly minute an escape of fluid under pressure from within the housing through which the shaft extends, that for all practical purposes it may be considered perfectly tight. This condition may be called "effectively tight".

The present invention has been developed in connection with the production of oil seals of the type described and claimed in co-pending application Serial No. 249,567, filed January 6, 1939, to provide a seal for holding liquids such as oil, soap and the like under pressure but the principles of the present invention are applicable to seals which do not necessarily involve the features of the seal described in said prior application.

An embodiment of the present invention including also features of the seal shown in said prior application will be described for the purposes of illustrating the principles of the invention but it will be understood that this embodiment is illustrative merely. Seals embodying the invention may be designed for retaining various materials such as liquid chemicals and even vapors and other gases.

The invention provides in the preferred embodiment a seal wherein a member having a smooth annular bearing surface is engaged by a flexible impervious annular member or diaphragm rotatable thereagainst to provide an edge contact, which in the initial unworn condition of said flexible member is preferably substantially a line contact, against the smooth surface and wherein an annular support is provided to resist pressure tending to distort unduly the flexible member.

It is a feature of certain embodiments of the invention that a sealing member that is flexible and thereby adapted to certain of the requirements for effective sealing but of a strength insufficient of itself to sustain the fluid pressures to which it is subjected in use is supported against such pressures. The support may be that of a simple rigid member or more elaborate provision may be made to provide a support particularly adapted to the requirements of the particular seal.

In the embodiment of the invention more particularly herein described the member providing the smooth bearing face is the outer member and it is fixed within the casing which may be either fixed or rotatable. For convenience it is hereinafter referred to as the "race." The yieldable flexible impervious member engaging the bearing surface to provide a fluid tight seal is carried by the shaft and rotates therewith. It will be understood, however, that a reversal of arrangement of some or all of the elements is possible while retaining certain features of the invention.

It is preferable that the parts shall be so constructed and arranged that the contact between the flexible impervious member and the smooth bearing surface against which it moves shall be at an edge of one part, preferably at the edge of the impervious member, as distinguished from an arrangement in which a side face of the impervious member bears against the smooth bearing face at a position spaced from the edges of both elements. Furthermore, it is advantageous so to arrange the elements that the contact is relatively a line contact, that is to say a contact of very small area, between the edge of one member, preferably the flexible impervious member, and the face of the other member, as distinguished from an arrangement in which a wide face to face contact obtains.

In high pressure sealing the pressure against the diaphragm tends to flex unduly the diaphragm and also tends to increase unduly the pressure of the diaphragm against the race. The present invention provides means for supporting the diaphragm against such pressure and for maintaining the contact as relatively a line contact even at very high pressures. Various arrangements for providing position or yielding pressure are possible. While a fluid pressure or other yieldable support has advantages in certain installations a positive support is preferred in other installations, especially if the relative longitudinal movement is slight.

As a simple and effective supporting means a disk spring or a rigid support shaped to conform to the shape of the diaphragm under the conditions of operation will be illustrated. Such support can be so designed with relation to the other parts of the seal as to leave a relatively narrow space to be bridged by the unsupported diaphragm.

The impervious member should be formed of a material which meets several different requirements. It must be one which under the conditions of use will not roughen or wear unduly either itself or the race when rotated thereagainst for long periods and at the speeds and under the pressures of the particular use for which the seal is designed. It must resist the action of oil, grease or other fluids to which it is exposed, and must withstand indefinitely the heat to which it is exposed. It must have sufficient strength to carry the pressure over the span between supports and yet must have such flexibility as is necessary to insure a tight seal. By providing support as herein described the span may be made small and material may be used effectively which would be of insufficient strength without such support. Excellent results have been obtained with impervious members of fibrous material impregnated with phenolic condensation products. The material used in the seal shown is a laminated sheet structure of fine cotton or linen fabric impregnated and coated with Bakelite and sold under the trade-mark "Formica" by the Formica Insulating Company of Cincinnati, Ohio. This material may contain an impregnation of phenol formaldehyde. Various other fibrous materials impregnated with resinous condensation products may be substituted as equivalents.

The nature and objects of the invention will be better understood from a description of an illustrative embodiment thereof for the purposes of which description reference should be had to the accompanying drawing forming a part hereof and in which—

Figure 1 is a central sectional view of a seal embodying the principles of the invention, Fig. 2 is a similar sectional view showing a modified form of supporting member, Fig. 3 is a side view partly in section taken from the left of Fig. 1, Fig. 4 is a central sectional view of another embodiment of the invention, wherein the supporting pressure is proportional to the pressure retained by the seal, and Fig. 5 is a view showing means for preventing movement of the seal members under pressure.

In the construction shown the seal is in part similar to that illustrated in my co-pending application above cited. It comprises an outer member or race 5 which in use is fitted tightly within the wall of the casing to prevent any possible leakage of oil between the race and casing and an inner member 6 designed to fit as tightly on a shaft which ordinarily is the rotating element. The outer member or race 5 of the arrangement shown is formed to present a central inwardly directed annular portion having two opposite bearing faces. The bearing face 7 will for convenience be termed "the inner bearing face" because that side of the seal is designed preferably to face the interior of a casing subjected to pressure. The face 8 will be termed "the outer bearing face." The inner member or flanged sleeve 6 supports the moving parts of the seal. In order to prevent flow of oil or other fluid longitudinally of the shaft between the rotatable member 6 and the race 5, an arrangement of flexible members is provided whereby an effective, tight seal is maintained at all times whether the parts are relatively rotating or still. As shown, the bearing face 7 is engaged by an impervious flexible disk or diaphragm 10 which is maintained yieldably in contact with the bearing face 7 thereby maintaining oil sealing contact even during slight relative longitudinal movement of the race and the sleeve and also maintaining contact during eccentric relative movements of these parts.

The impervious diaphragm shown is cut from a sheet of Formica or equivalent material of a thickness of about 0.01 to 0.05 of an inch. A thickness of 0.015 to 0.02 of an inch for seals for shafts of the diameter of 1 to 8 inches and pressures up to 500 lbs. per square inch is preferred. For pressures up to 2500 lbs. per square inch and the same shaft sizes the Formica may be of a thickness of from 0.03 to 0.05 of an inch with less initial deflection. For higher pressures and seals of larger diameters correspondingly stronger Formica may be desirable. In cutting the diaphragm care is taken to insure a sharp continuous edge without nicks or blemishes for engagement with the bearing face 7, as distinguished from a roughly cut or rounded edge. It is to be noted that in the arrangement shown the area of contact between the bearing face of the race and the flexible diaphragm partakes of the nature of a line contact as contrasted with an extended face to face contact and it terminates sharply at the outer edge or corner of the diaphragm as contrasted with the condition which would obtain if the outer edge were rounded or irregular. Each of these two features contributes to the effectiveness of the seal. It is preferred that both features be embodied in the seal.

In the embodiment illustrated this is accomplished by so designing and assembling the interengaging parts that an "edge contact" is maintained between the outer edge of the impervious flexible member and the bearing face 7 of the race. To maintain such an edge contact in the illustrated arrangement the angle of the surface 7 to the plane of the race is made between 18 and 22° and the resiliency of the impervious flexible member and of the means pressing the same against the bearing surface are such that the angle between the bearing surface 7 and the engaging face of the impervious member at its contacting edge is small, preferably between 5 and 15°. As shown, the impervious disk 10 is pressed against the bearing face of the race by a disk spring 11.

The diameter of the disk spring is so chosen that it will definitely insure contact of the edge of the impervious member with the bearing face 7 and at the same time such that it will not itself engage the bearing face. This is accomplished by making the spring and the impervious disk of substantially the same diameter.

A protective disk 12 of felt or equivalent material is provided adjacent the spring disk 11 and in turn this felt disk is pressed inward by a spring disk 13. The felt disk filters the oil and serves to prevent any fine particles of grit from entering into the position of engagement of the impervious member and the bearing face of the race. Accordingly the felt disk is of a size to fit as closely as may be against the face 7. In use the felt presses inwardly against the surface 7 in position exterior to the impervious disk 10 and the spring 11; the spring 13 maintains the felt member pressed firmly toward the surface 7 and furthermore, acting through the felt 12, reenforces the action of the spring 11 to hold the impervious member in contact with the surface 7.

As the result of the yieldable spring pressure the impervious member and the felt are maintained in effective engagement with the surface 7 during rotation even during such movement as is caused by eccentricity of the shaft relative to the race and during such longitudinal movement or float of the shaft relative to the casing as may occur due to bearing wear, provided the relative movement does not exceed that for which the seal is designed.

The flexible diaphragm 10 can, with certain advantages, be so designed that alone and unsupported it will not withstand high pressure against its concave face. The invention provides support for the diaphragm such that the disadvantages of flexibility and yieldability are compensated and the advantages retained. When the seal is used to retain high fluid pressure within a casing the high pressure against the diaphragm 10 tends to flex the diaphragm and to change the angle at the line of contact with the race. This unduly increases the pressure against the bearing face 7 and also it distorts the diaphragm so that the diaphragm tends to bear against the bearing face over a wider area with the result that the sealing contact at the outer edge of the diaphragm tends to become less reliable.

In the construction illustrated in Fig. 1 the diaphragm 10 is supported on its convex side by a rigid unyielding annular member 14. The exact contour of the face 15 against which the diaphragm is supported will depend upon the amount of relative movement longitudinally of the shaft between the race and the shaft on which the seal is mounted, the pressure and other factors. If the motion is slight the contour of the face 15 may be practically that of the normal curvature of the diaphragm with perhaps a slight clearance between the face 15 and the diaphragm. If a greater longitudinal movement is to be provided for a greater clearance may be desirable especially toward the outer edge of the surface 15, in order that the diaphragm may in all positions engage the bearing face to provide an effective seal. If the seal is to be used for withstanding extremely high pressures it may be desirable to lay out a particular curvature for the face 15 which will provide an annular line of support so positioned between the shaft and the circumference of the supporting member 14 that the pressure radially inward from that bearing line will tend to counterbalance the pressure against the diaphragm radially outward from that line so as to cause the pressure at the outer bearing edge of the diaphragm against the bearing face of the race to be much less when the pressure is high than it would be in the seal shown in Fig. 1.

In Fig. 2 a form of contour for the supporting member 14' is shown which illustrates the principle involved but this contour will be varied in practice to suit the particular conditions.

If the diaphragm be considered as a number of radial segments loaded by the fluid pressure thereagainst and supported by the adjacent elements it will be clear that each segment partakes of the nature of a continuous beam supported at both ends and at an intermediate point and loaded throughout its length. The supposed beam may be considered as having a cantilever support at its inner end, a support at the point 16 against the race and an intermediate support at 17, the annular line of support above discussed. Slight clearances radially inward, and possibly radially outward, from the point of support 16, shown considerably exaggerated, will permit the flexing of the diaphragm to carry the load after the manner of a beam which is continuous over one or more supports. The design must be such that the sealing edge of the diaphragm contacts with the race under all conditions and is never lifted therefrom as the flexure occurs.

Under certain conditions and especially if the relative longitudinal or eccentric movement between the race and the shaft is considerable it is advantageous to provide a yieldable support against the convex face of the diaphragm.

In Fig. 4 such an arrangement is illustrated. As there shown the annular spacing and supporting member 20 is formed with an annular recess in which is positioned a pneumatic pressure member or Sylphon 21 in which a fluid pressure equivalent to the pressure with in the casing will be maintained through a duct 22 leading from said pneumatic member to the interior of the casing. Occasionally for meeting special requirements it may be desirable to provide a spring as indicated at 23 to add to the pressure provided by the fluid pressure device.

It is desirable to provide means for excluding dust and dirt from the interior of the casing as in the seal shown in the co-pending application above cited and in other co-pending application. As shown, the outer bearing face 8 of the race, which may lie at an angle of about 18° to the plane of rotation is engaged by a protective disk 25 of felt or other equivalent materials which in turn is pressed inward by a disk spring 26 to maintain effective contact. The felt is preferably impregnated with a suitable lubricant such as water dispersed colloidal graphite or the like and also with water-repellent compound.

In mounting the several annular members on the sleeve 6, it is necessary to insure a complete oil tight condition to prevent by-pass around the seal. Accordingly, the felt members are made of an internal diameter greater than the external diameter of the sleeve 6. A spacing ring 27 of substantially the thickness of the felt member 12 when compressed is fitted within the felt member. A similar arrangement for the felt member 25 is provided by a shoulder 28 on the spacer member 14. An outer ring 30 is provided on the member 6 as a supporting member for the closing operation and the disk springs, the diaphragm, the spacer member 27 and the retainer ring 30 are all firmly clamped by forming the end of the flanged sleeve 6 outward around the ring to provide the flange 31.

The space between the periphery of the supporting member 14 and the race is preferably as small as the clearance for eccentricity will permit. In suitable cases, it may be a close running fit. The angle of the bearing face 7 relative to the plane of the ring may vary with the size and the requirements of use of the seal. In general it may be about 18 to 22°, as explained in my copending application above cited.

The proportions and arrangements are such that ordinarily, and preferably, the impervious member is convex or at least flat toward the bearing surface 7, but this is not a necessary arrangement.

The shape of the race may be varied to provide a wide (radially) bearing face against which the dust sealing felt member bears to afford a considerable area of contact while the bearing face engaging the flexible diaphragm is narrow and permits the supporting member to extend close to the circle of contact. This involves a stepped race construction.

It is necessary that provision be made for positively holding the race and the inner sleeve against longitudinal movement in the casing and on the shaft respectively to resist the pressure thereagainst.

In Fig. 5 there is shown conventionally an arrangement whereby the race is held by nut 33 and the central sleeve assembly is held by a collar 34 keyed to the shaft by a pin 35.

The foregoing particular description of structure and materials used is illustrative merely and is not intended as defining the limits of the invention.

I claim:

1. A fluid seal comprising, in combination, an outer beveled annular member having a smooth bearing face inclined to the plane of the member, an inner flexible impervious annular diaphragm presenting a convex face bearing at its outer edge against the smooth bearing face to provide a seal and rotatable thereagainst, said diaphragm being of a shape to present an annular sharp edge at one limit of the area of contact with the smooth bearing face, and an annular support presenting a concave face to engage the convex face of the flexible diaphragm and support said diaphragm when under pressure.

2. A high pressure oil seal comprising relatively rotatable outer and inner members including an outer beveled annular member having oppositely disposed smooth bearing faces inclined toward each other inwardly, an inner flexible annular member impervious to oil having a convex face bearing against one bearing face, an annular felt member bearing against the opposite bearing face, an annular member between the flexible annular member and the felt member presenting supporting faces engaging the flexible annular member and the felt member to limit movement of both toward each other and means including disk springs pressing said impervious member and said felt member yieldably against the bearing faces of said outer annular member.

3. A fluid seal comprising, in combination, an outer beveled annular member having a concave bearing face, an inner impervious flexible annular member convex toward said concave bearing face and bearing at its outer edge against said bearing face to provide an edge contact, a supporting member rotatable with the impervious flexible annular member having one face concave toward the impervious flexible annular member and cooperating with the outer annular member to provide a substantially continuous support against which the impervious flexible annular member bears.

4. A fluid seal comprising, in combination, an annular member having a smooth bearing face, a flexible impervious diaphragm of a strength insufficient effectively to resist unsupported the pressure for which the seal is designed bearing at one edge and having relative rotatable engagement against said bearing face and forming an angle of between 5 and 15° therewith, an annular supporting member rotatable with the diaphragm and closely adjacent thereto normally spaced to provide a slight clearance between it and the diaphragm but in position to cooperate with the bearing face to support the diaphragm against high fluid pressure applied thereto.

5. A fluid seal comprising, in combination, an annular member having a smooth bearing face, a flexible impervious diaphragm bearing against said bearing face and having relative rotatable engagement thereagainst along a narrow annular bearing area, one of the engaging members being of a shape to present a sharp edge at one edge of the annular bearing area, an annular supporting member rotatable with the diaphragm and slightly spaced from but closely adjacent thereto in position to cooperate with the bearing face to support the diaphragm against high fluid pressure applied thereto.

6. A fluid pressure seal comprising, in combination, an annular member having a smooth bearing face, a flexible impervious diaphragm bearing at one edge and having relative rotatable engagement against said bearing face and forming a slight angle therewith, a fluid pressure supporting device supporting said diaphragm against the pressure thereagainst and means for maintaining a pressure in said device proportional to the pressure against the seal.

7. A high pressure seal comprising, in combination, an annular member having a smooth annular bearing face, a flexible annular member of organic material bearing at one edge against said bearing face at a slight angle thereto to provide substantially a line contact and rotatable thereagainst, said member being adapted to be subjected to high fluid pressure, yieldable means engaging said impervious annular member and pressing the same yieldably against said bearing face during periods of low pressure, and a rigid unyielding concave annular member rotatable with said flexible member and normally having a clearance therewith but adapted to be engaged by said flexible member and to support the same when high fluid pressure is applied against said flexible member.

8. A high pressure seal comprising in combination an annular member having a smooth annular bearing face, a flexible impervious diaphragm bearing at its outer edge against said bearing face and at a slight angle thereto to provide substantially a line contact, an annular member rotatable with the diaphragm and engageable thereagainst along a line adjacent said bearing face but having clearance radially inward from the line of support whereby the diaphragm may flex toward said annular member about the line of support when high pressure is applied against the diaphragm.

9. A high pressure seal comprising in combination an annular member having a smooth annular bearing face, a flexible impervious diaphragm bearing at its outer edge against said bearing face and at a slight angle thereto to provide substantially a line contact, a rigid unyielding concave annular member rotatable with said diaphragm and engageable with such diaphragm along a line adjacent the bearing face and having a clearance radially inward from the line of support but adapted to be engaged by the diaphragm and to support the same when high fluid pressure is applied against said diaphragm.

FURNESS HALL HATELY.